W. HOCHHAUSEN.
Magneto Electric Machine.

No. 233,515.  Patented Oct. 19, 1880.

Witnesses
Chas. H. Smith
Geo. J. Pinckney

Inventor
Wm Hochhausen
per L. W. Serrell
atty

UNITED STATES PATENT OFFICE.

WILLIAM HOCHHAUSEN, OF NEW YORK, N. Y.

MAGNETO-ELECTRIC MACHINE.

SPECIFICATION forming part of Letters Patent No. 233,515, dated October 19, 1880.

Application filed January 28, 1878.

*To all whom it may concern:*

Be it known that I, WILLIAM HOCHHAUSEN, of the city and State of New York, have invented an Improvement in Magneto-Electric Machines, of which the following is a specification.

My present invention relates to that class of dynamo-electric machines in which the armature is revolved by power between the ends of a magnet that is polarized by an electric current circulating through insulated helices surrounding the cores, and the same is an improvement upon Letters Patent No. 181,342, granted to me August 22, 1876.

I make use of a vessel surrounding the induction-coil and revolving armature, into which vessel water or other liquid is introduced, so that the armature and coils are kept cool by direct contact with the water in which they revolve.

Figure 3:
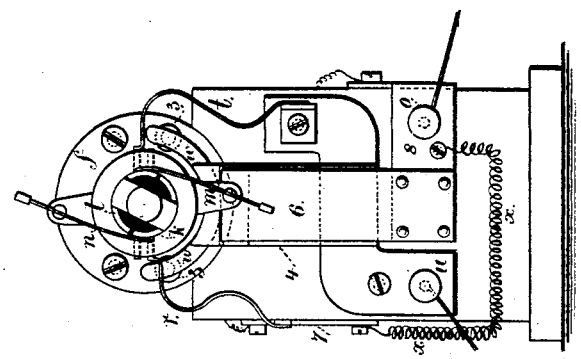
Figure 1:
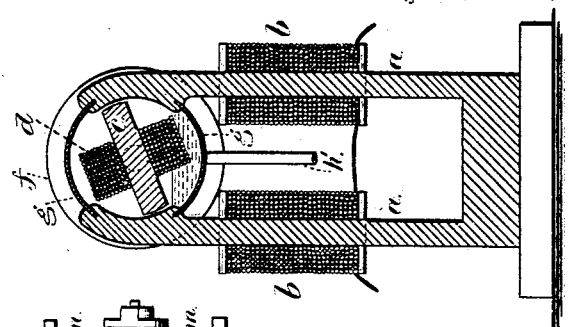
Figure 2:
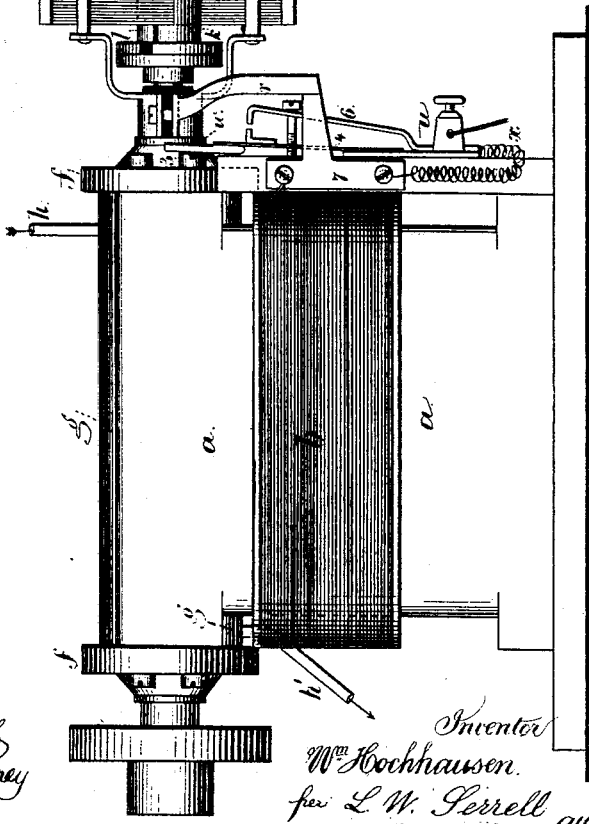

In the drawings, Figure 1 is a cross-section of the machine. Fig. 2 is a side view, and Fig. 3 is a front elevation.

The electro-magnet $a$ is surrounded with the helices $b$. The armature $c$ is between the poles of the magnet $a$, and it is wound longitudinally with the helix-wires $d$, substantially as in the aforesaid patent.

Instead of applying a case above the revolving armature and magnetic poles, I connect heads $f$ to the poles of the magnet, with sheet-metal or other suitable cases $g$ above and below the armature, and I connect the parts tightly, so as to form a water-tight chamber, into which water is allowed to flow by the pipe $h$ and escape by the pipe $h'$.

In the heads $f$ are the bearings for the shaft of the armature, and these may have packing-glands, so that water will not leak out of the chamber in which the armature revolves. The armature as it revolves dashes the water around in the chamber and causes the heat generated to be absorbed, so that the parts do not become warmed or heated.

The commutator-connections are through the hollow shaft of the armature from the helix to the cylindrical segments $k$ $l$, and the rubbers or springs $m$ $n$ may be adjustable, as in aforesaid patent.

The electric circuit is through the binding-screw $o$, thence through the helix $b$ to the spring $r$, frame and rubber $m$, through $l$ or $k$ and armature-helix, back to the rubber $n$, frame and spring $t$, to the binding-screw $u$. The wires from $o$ and $u$ lead to the plating-bath, as usual, and I remark that said bath may be of any desired character.

Under certain conditions the anode and cathode in a solution will be charged as a secondary battery by the working current. This charge would traverse the entire circuit, including the magnet-coils, in opposite direction to the primary current, the moment the latter current is diminished enough in intensity by slackening of speed, falling of a belt, or otherwise to be overpowered by the former. This would reverse the polarity of the machine, and consequently the electrolytic action, reducing where it deposited before. To prevent this occurrence an attachment is provided, which automatically closes a short circuit for the harmless discharge of the secondary current as soon as the latter has become strong enough to partly neutralize the primary current, thereby weakening the magnet and releasing a little the armature.

At the ends of the poles $b$ are the screws or pins 3 3, projecting through the head, and there is a soft-iron armature, $w$, upon the end of the spring-plate 4, that connects to the plate of the binding-screw $u$, and there is an adjacent plate, 6, connected with the binding-screw $o$. When the pins 3 3 are magnetized by induction from the electro-magnet $b$ the keeper $w$ is attracted and the circuit between the plates 4 and 6 is broken; but when the magnetism lessens in $b$ the keeper $w$ springs back from 3 and closes the circuit between 4 and 6, short-circuiting any false current from the plating-bath.

In the helices $b$ $b$ of the electro-magnet the current pulsates, there being a rise and fall of electric tension. This produces an extra or counter current, which, reacting at the commutators, intensifies the spark and tends to rapidly destroy the same. I find practically that this is lessened and the magneto-electric machine rendered more durable and uniform in its action by a metallic shunt-connection from one end of the magnet-helix to the other. This I effect by the helix or rheostat $x$, that passes from the plate 7 to the plate 8. The amount of resistance of this shunt is to be regulated according to the speed of the motor and its electric capacity.

This improvement is available in electro-magneto machines in which more than one revolving armature and helix are made use of.

I claim as my invention—

The combination, with the revolving armature and helix in a magneto-electric machine, of a case containing water or similar liquid, with which such revolving armature is in direct contact, substantially as and for the purposes set forth.

Signed by me this 25th day of January, A. D. 1878.

WILLIAM HOCHHAUSEN.

Witnesses:
GEO. T. PINCKNEY,
CHAS. H. SMITH.